June 2, 1942.     F. W. TURNBULL     2,284,779
DOUBLE ACTING CONE DISPENSER
Filed Jan. 11, 1939     2 Sheets-Sheet 1

INVENTOR
Francis W. Turnbull
BY Carmack Waterhouse
ATTORNEY

June 2, 1942.  F. W. TURNBULL  2,284,779
DOUBLE ACTING CONE DISPENSER
Filed Jan. 11, 1939  2 Sheets-Sheet 2

INVENTOR
Francis W. Turnbull
BY Carmack Waterhouse
ATTORNEY

Patented June 2, 1942

2,284,779

UNITED STATES PATENT OFFICE 2,284,779

DOUBLE ACTING CONE DISPENSER

Francis W. Turnbull, Chattanooga, Tenn.

Application January 11, 1939, Serial No. 250,379

6 Claims. (Cl. 312—44)

My invention relates to dispensers and more particularly ice cream cone dispensers of the double acting type and is an improvement upon the dispenser described and claimed in my copending application Serial No. 188,616 filed February 4, 1938, and issued as Patent No. 2,235,855. In the prior art, it has generally been the practice to keep ice cream cones in glass cases, cardboard boxes, and other places for use. In these places, they are often unprotected from moisture which causes them to become soggy, subject to contact with other objects where they are broken, and are not quickly and readily obtainable when desired and cannot be attractively displayed to the customer to receive his attention.

Where large volumes of ice cream cones are consumed, the problem of quickly and readily dispensing the cones without consuming too much space is a great problem.

Some unsuccessful attempts have heretofore been made to overcome these handicaps by providing means for vending these cones from a machine.

Applicant with a knowledge of all these objections to and defects in the prior art has for an object of his invention the provision of a double acting dispenser which will dispense one or a plurality of cones on each half cycle of movement of the release or ejecting means.

Applicant has, as a further object of his invention, the provision of a cone dispenser which will dispense a large volume of cones, will occupy a minimum of space and will reduce the number of moving parts to a minimum.

Applicant has, as another object of his invention, the provision of a cone dispenser which is sanitary and which will protect the cones from breaking after they are released, by employing converging arms or extensions of resilient material that receive and hold the cones after release by the dispenser mechanism but which easily permit removal by the operator without exerting more than a minimum of force upon them. These flexible arms or portions are foldable inwardly and upwardly to close the dispenser and protect the cones from exposure or from injury.

Applicant has, as another object of his invention, the provision of a cone dispenser having an upper portion of any material such as the cardboard package in which the cones are shipped or some ornamental top of metal, glass or other appropriate material.

Figure 3:
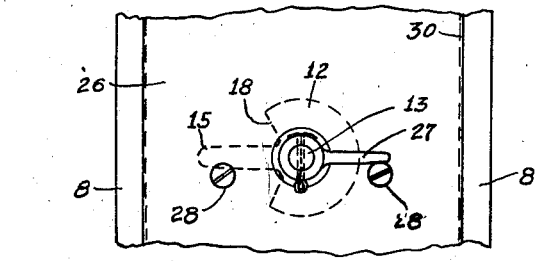
Figure 1:
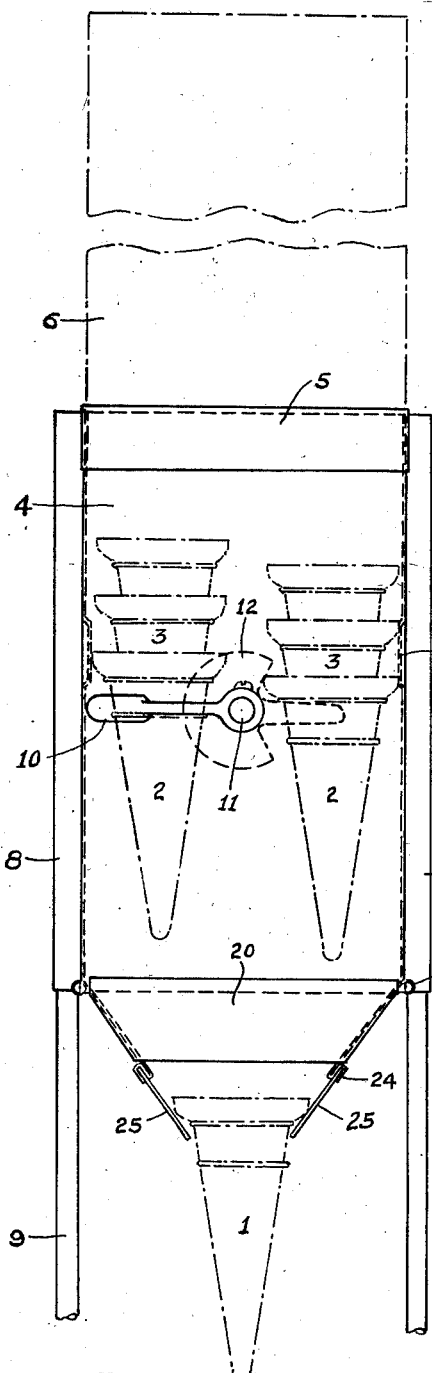
Figure 2:
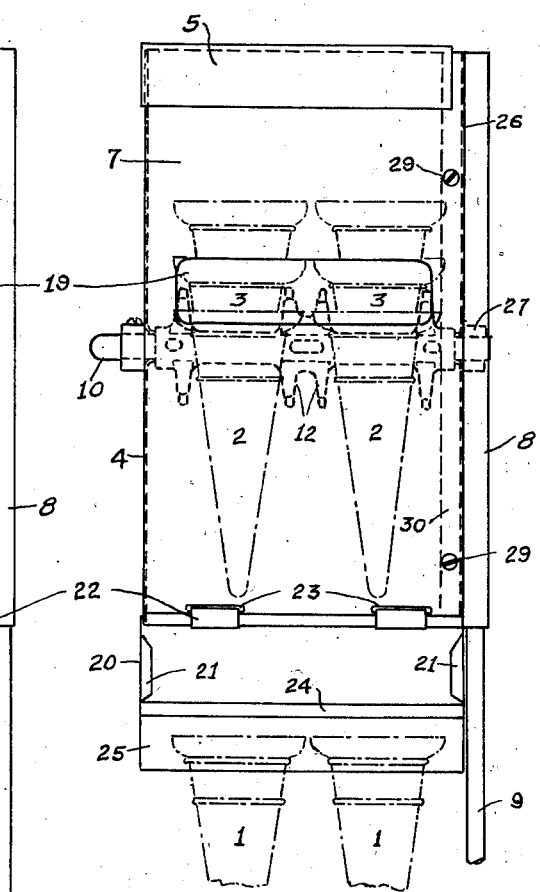
Figure 5:
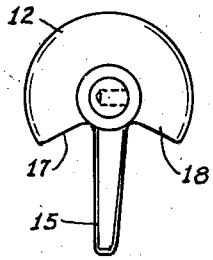
Figure 4:
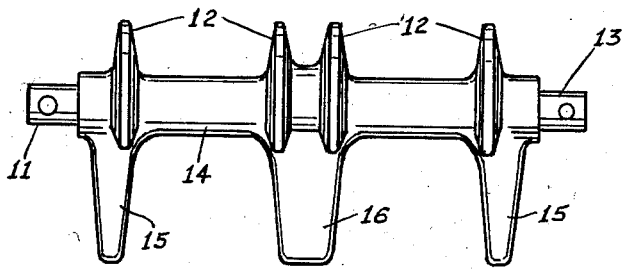
Figure 6:
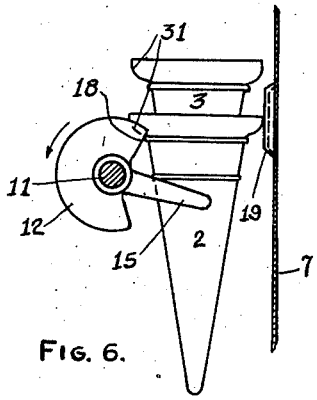
Figure 7:
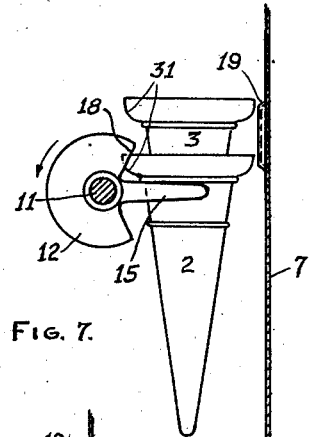
Figure 9:
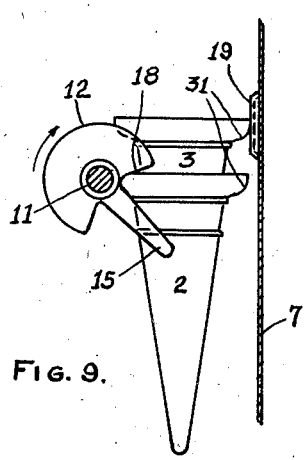
Figure 8:
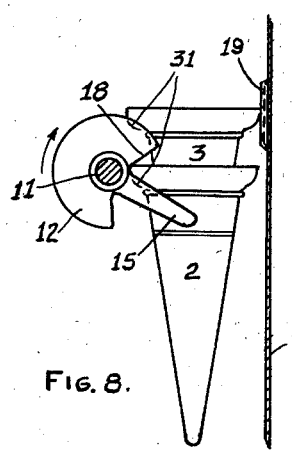

Other objects and advantages of my invention will appear from the following specification and accompanying drawings and the novel features thereof will be particularly pointed out in the annexed claims. In the drawings, Figure 1 is a front elevation of my improved dispenser. Figure 2 is a side elevation of the same dispenser. Figure 3 is a fragmental view of the rear of the same dispenser. Figure 4 is a plan view of the ejector employed in my dispenser. Figure 5 is a side view of the same ejector. Figure 6 is a detail showing the ejector and wall of the dispenser just after the ejection of a cone. Figure 7 is a view of the same mechanism after the ejector has returned to normal position. Figure 8 shows the same mechanism ejecting a cone in its normal position. Figure 9 is the same ejector mechanism ejecting a cone which has stuck to the stack.

Referring to the drawings in detail 4 designates a housing or base for carrying the dispensing mechanism and for enclosing the cones 1, 2, 3, etc. The ejecting mechanism includes a shaft 11, 13 passing transversely through the central part of the base or housing intermediate its upper and lower ends. Mounted on extension 13 of the shaft by means of a cotter pin, is an arm 27. The arm 27 is adapted to abut against stops 28, 28 on either side of the rear face of the housing 4. In this manner the arm 27 is stopped at the horizontal position on either side of the pivot 13. Mounted on the shaft and projecting horizontally therefrom are fingers 15, 15 and 16. Mounted on the shaft adjacent to fingers 15 and 16 are ears, ribs or projections 12, which are positioned radially on either side of the fingers and are of arcuate configuration, extending over substantially a sector of a circle with about 15 degrees offset on both sides of fingers 15 and 16. Mounted on the front of the dispenser and engaged with projection 11 of the shaft and secured thereto by appropriate set screws or other means is a handle 10, adapted to swing from one horizontal position to another, having its path of movement limited by cooperation of the arm 27 with the stops 28.

Formed on the rear of the housing 4 and extending vertically along its rear edges are tubular projections 8, 8 for the reception of supporting rods or other appropriate means 9, 9. Encircling the upper end of housing 4 and projecting on beyond it is a band 5 which is spaced from the housing 4 in such a way as to permit the passage of portions of an upper container or cover 6 to be held between the band and housing to enclose the upper part of the stacks of cones which project beyond the open end of housing 4. Passed inwardly on opposite sides 7, 7 of the housing 4 are bosses 19, 19, which cooperate with the tops of the cones in the dispensing operations. At the lower end of the housing, doors 24, 24 are hingedly joined thereto and carry flexible flaps 25, 25 sandwiched between lower end portions of the doors for engagement with the ejected cones. Secured to the lower ends of the back and front walls of housing 4 and projecting parallel therewith are blades 20. Said blades are tapered along their edges, and said tapered edges bent inward at right angles to form projecting door stops 21, upon which doors 24 rest when opened, preventing said doors from opening wider than the inclined plane between the corresponding tapered edges of opposite doors. Hinges 22, 22 are formed as extensions and pass through openings 23, 23 in the walls of the housing 4. Figure 4 indicates two pairs of arms on the shaft 13, 11 with corresponding ears, ribs or projections 12, terminating about 15 degrees away from the fingers 15, 16 on either side to define shoulders 17, 18.

The ejecting mechanism can have one pair or any number of pairs of ribs depending upon the number of cones desired to be ejected from the dispenser at any one time.

The dispenser may be operated by rotating the handle 10 clockwise from its position in Figure 1. Before the rotation begins, one set of cones on the left side of the axis 11, as shown in Figure 1 are supported through their lowest cone, 2, which rests upon ribs or extensions or ears 12, 12. On the right side of axis 11, 13, the stack of cones appearing in Figure 1 is also supported through the lowermost cone by fingers 15 and 16 which engage the top of said cones.

The action of the ejector mechanism during the various stages of its operation is disclosed in Figures 6 to 9. For convenience in illustrating these figures, the stack of cones on the left of the axis 11, 13 have been omitted. As the lever 10 is moved clockwise, the fingers 15, 16 move from their position in Figure 7 to that shown in Figure 8. Since cone 3 is supported by engagement of its intermediate bead with the top or a shoulder within the top of cone 2, it is seen that the tops of cones 2 and 3 are spaced apart a sufficient distance for the ribs or ears 12 to freely pass between them and engage the second cone 3 of the stack to support it.

As the top 31 of the cone 3 is engaged between boss 19 and projections or ribs 12, the bottom cone 2 begins to slide downwardly and separates itself by action of gravity from the stack, following and being supported by fingers or prongs 15, 16.

During this operation the stack of cones on the left of the pivot 11, 13 is supported by its lowest cone 2 whose top rests upon ribs or projections 12 which are of arcuate configuration and complete as already indicated a sector of a circle.

By the time the lever 10 has reached the vertical position and fingers 15, 16 are in the position shown in Figure 5 the cone 2 from the right stack has been released and has dropped by gravity into flexible extensions or flaps 25, 25 and is yieldingly supported by them in a manner indicated in Figure 1. Just before the handle 10 reaches its horizontal position at the other extremity the lowest cone 2 of the left stack reaches the end of the ribs 12, 12 becomes disengaged therefrom and falls to and rests upon fingers 15 and 16 as they come up to horizontal position. Handle 10 has been rotated in a counterclockwise position ejecting the bottom cone 2 from the stack on the left side of the pivot, 11, 13, in a manner similar to that previously described.

Figure 6 shows how the bottom cone of the right stack is transferred from the ears or ribs 12 to the fingers 15 and 16, and Figure 7 shows the stack after the transfer has been completed.

It will thus be seen that this single dispenser mechanism dispenses from either stack and ejects twice on each cycle resulting in a quicker action and a greater volume of cones dispensed with only one set of moving parts, reduces the movement of the parts entering into the operation and eliminates the use of springs or weights to return the mechanism to operative position after each ejection.

Should the bottom cone for any reason become stuck to the second cone, the shoulders 17, 18 do not ordinarily come in contact with the top of the cones since they ordinarily operate very freely by gravity, but do engage and release the stuck cones.

The doors 24, 24 are preferably formed of metal or some other relatively rigid material and carry the flaps or extensions 25, 25 in a manner already described. These flaps 25, 25 are flexible and receive the cones 1, 1 after they are dropped by the dispensing mechanism. The operator may easily remove the cone from these flaps by simply pulling at any angle upon such cones with a very slight force, thereby eliminating any possibility of breakage.

At night, or when not in use, the doors are simply swung upwardly and inwardly so that the flaps 25, 25 either abut or overlap closing the dispenser making it sanitary and preventing the entrance of moisture which will make the cones soggy.

The hinges 22, 22 engage the housing 4 frictionally to maintain the doors in the desired position.

The upper end of the cone dispenser may have a light or any other heating means to insure that the cones are always brittle and dry. It will be obvious that while applicant has only shown one dispensing unit, it is very easily possible to provide a series of these units adjacent each other and dispense a very large volume of cones.

It is to be noted that the lever 10 or the arm 27 is of sufficient weight to counter-balance the force of any stack of cones, which is placed upon the fingers 15, 16, or if desired a counter-weight associated with the shaft 11, 13 to prevent its rotation under the force of the stack of cones resting upon the fingers 15, 16.

Having thus described my invention, I claim:

1. A cone dispenser of the character described comprising a base including means for supporting a plurality of vertical stacks of nested ice cream cones through the bottom cone of each stack, additional means for supporting stacks of nested ice cream cones, means for disengaging said supporting means from the bottom cone of each of said first stacks while supporting them by said additional means, and for engaging said supporting means with the bottom cones of said last said stacks, whereby to release the first named bottom cones from said first stacks.

2. A cone dispenser of the character described comprising a base, a pivoted holder extending across said base, means for cooperating with said holder to position sets of vertically nested cones on either side of said holder and to support them through the bottom cone of each stack, means for alternately disengaging said holding means from the lowermost cone of stacks on either side thereof and for engaging it with the next cone in said stacks whereby to release the bottom cones therefrom and permit them to fall by gravity.

3. A cone dispenser of the character described comprising a housing for the reception of vertical stacks of cones, a holder supported on a horizontal axis for cooperation with the housing in supporting cones, ears on said holder, fingers projecting radially from said holder, said ears and said fingers being adapted to support stacks of nested cones on either side of the holder through the bottom cone of each stack, means for operating said holder to alternately disengage said fingers from the bottom cone of each stack on either side of said holder and engage the ears with the cone next above to support the stacks and to dispense the cones.

4. A cone dispenser of the character described comprising a body for receiving vertical stacks of ice cream cones, a holder supported on a horizontal axis, ears mounted on said holder for engaging the bottom cones of said stacks to support them, fingers mounted on said holder and spaced from said ears, means for rotating said holder in one direction to disengage said fingers from the bottom cone of a stack and engage the ears with the next cone of the stack to release the bottom cone, and to disengage the ears from the bottom cone of another stack and engage the fingers with such bottom cone, and movable in the opposite direction to disengage the fingers from the bottom cone of the latter stack and engage the second cone with said ears to release said bottom cone, whereby to obtain a double acting holder.

5. A cone dispenser of the character described comprising a base including, means for supporting a nested stack of ice cream cones through the bottom cone of said stack, additional means for supporting a second stack of nested ice cream cones through the bottom cone thereof, means for disengaging said first means from the bottom cone of said first stack to permit it to fall by gravity, and for engaging said additional means with the cone next above for supporting said first stack while still engaging the bottom cone in said second stack and supporting it.

6. A cone dispenser of the character described comprising a holder for a plurality of stacks of nested ice cream cones, positioning means for cooperation with the holder, said holder including supporting means, and means for alternately disengaging said supporting means from the bottom cone of one of said stacks and engaging it with the bottom cone of another of said stacks to dispense cones therefrom.

FRANCIS W. TURNBULL.